Jan. 14, 1947.　　　　H. D. MIDDEL　　　　2,414,318
PHASE SENSITIVE MODULATOR
Filed June 1, 1944
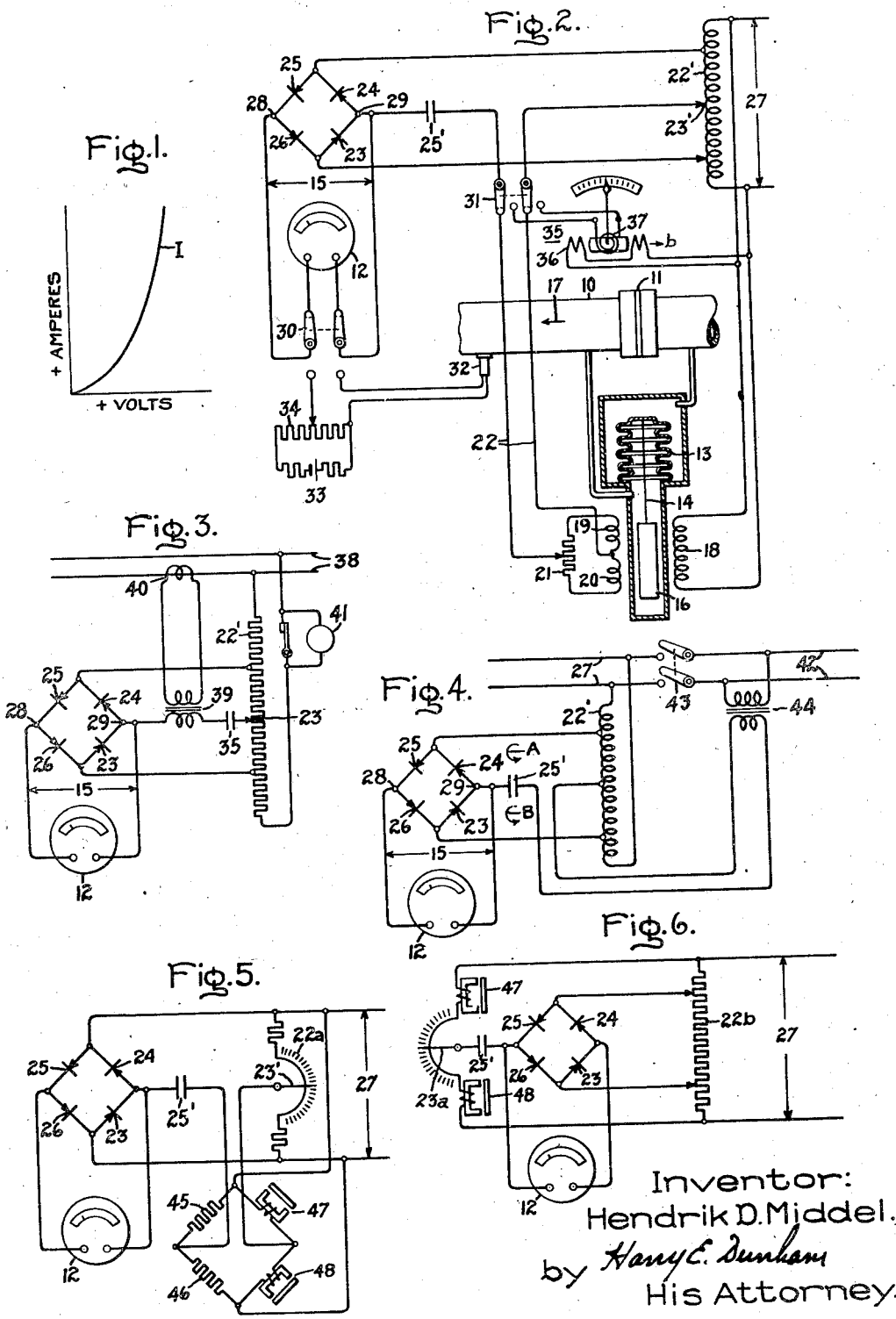
Inventor:
Hendrik D. Middel.
by Harry E. Dunham
His Attorney.

Patented Jan. 14, 1947

2,414,318

UNITED STATES PATENT OFFICE 2,414,318

PHASE SENSITIVE MODULATOR

Hendrik D. Middel, Schenectady, N. Y., assignor to General Electric Company, a corporation of New York Application June 1, 1944, Serial No. 538,271

5 Claims. (Cl. 171—34)

My invention relates to a phase sensitive modulator in which small values of alternating current may be reduced to proportional direct currents for measurement on a sensitive direct current type of instrument and wherein the polarity of the direct current reverses when the phase of the alternating current reverses. The modulator in question is supplied or excited with alternating current other than the alternating current to be measured and the phase of the excitation current is used as the phase reference to which the phase of the measurement current is compared. The invention may also be employed to measure phase relations and alternating current products, such as watts, which depend upon phase relation. Moreover, the modulator is reversible with respect to the input controlling and output measurement currents, and its use as a direct current controlled modulator is described and claimed in my copending application Serial No. 538,270, filed concurrently herewith and assigned to the same assignee as the present invention. The features of my invention which are believed to be novel and patentable will be pointed out in the claims appended hereto.

For a better understanding of my invention, reference is made in the following description to the accompanying drawing in which Fig. 1 shows a volt-ampere curve characteristic of a dry type of rectifier which characteristic is used in my invention. Fig. 2 represents an embodiment of my invention which may alternately be used as a direct current to alternating current modulator sensitive to both the magnitude and polarity of direct current input control, and as an alternating current to direct current modulator sensitive to the magnitude and phase reversal of the alternating current input control. Fig. 3 represents an embodiment of my invention employed for measuring the wattage of an alternating current power system using a sensitive direct current indicating instrument. Fig. 4 shows the application of my invention to a synchronizing device, and Figs. 5 and 6 represent slightly different arrangements for using a balanced reactance measurement bridge, the A.-C. output of which is converted to direct current by means of my modulator.

In Fig. 2, I have shown an embodiment of my invention which is represented as for alternate use as a flowmeter using an alternating current measurement current input transmitter and a direct current indicating instrument receiver, and as a temperature indicator using a direct current input transmitter and a phase responsive alternating current measuring instrument as a receiver. The apparatus is represented as connected for use as a flowmeter and such use will first be described. At 10 is a conduit having a measuring orifice 11, through which a fluid may flow, and the purpose of the apparatus shown is to indicate on a direct current instrument 12 the rate of fluid flow.

The pressure difference on opposite sides of the orifice 11 is measured by a flexible diaphragm 13 of an aneroid type flowmeter the opposite sides of which communicate with the conduit 10 on the two sides of the orifice 11. The upper end of the diaphragm or bellows rises and falls with changes in rate of flow and is attached to magnetic core member 15 by a rod 14. The position of the core indicates fluid flow in the direction of the arrow 17. The core 16 provides an inductive coupling between the primary winding 18 and the secondary windings 19 and 20 of a regulating transformer. The secondary windings are connected in series with an impedance 21, and output leads 22 connect to a point between the two secondary windings and an adjustable tap near the center of the resistance impedance 21. Assume that when there is normal fluid flow in conduit 10, the core 16 has an approximately centered position relative to the secondary windings and under this condition, the secondary voltages induced in each secondary winding will be approximately equal. The adjustable tap on resistance 21 is set so that there is no output voltage to the leads 22 when there is normal fluid flow. Now when there is above normal fluid flow in the direction represented, the core 16 will move downward a distance proportional to the rate of flow, and secondary transformer winding 20 will have a correspondingly higher voltage induced in it and there will be less voltage induced in secondary winding 19. Hence there will be an output current on leads 22 proportional to the difference in the voltages of the transformer secondaries. When fluid flow is below normal, core 16 will rise above a center position and the voltage of secondary winding 19 will predominate over that of winding 20. Again an output current will flow in leads 22 proportional to the core displacement from neutral but the phase of such output current will be opposite to that first assumed when referred to the phase of the primary. The voltage across impedance 21 remains fairly constant and the tap remains at the point thereof to which initially adjusted so that the connection of the output lead between the secondary windings when referred to the voltage of the tap on the resistance 21 reverses in phase with changes in fluid flow above and below normal rises and falls in proportion to the rate of fluid flow from normal. Hence this is a transmitting device producing an alternating current proportional to rate of flow from normal and the phase of which reverses with changes of fluid flow above and below normal.

This current flow through leads 22 is injected into my improved phase responsive current modulator to control the direct current output of the same and the polarity of such output, and I desire it to be understood that the form and purpose of the A.-C. transmitter is only representative of a wide variety that might be employed insofar as my invention is concerned.

The modulator consists of an impedance circuit 22' which may be balanced resistors, condensers or reactances, and a rectifier circuit having mesh connected dry type rectifiers 23, 24, 25, and 26 which circuits are excited in parallel from an A.-C. source of supply 27, assumed to be of constant voltage and frequency, and which is the same source that supplies primary winding 18 of the transmitter, although the voltages on the transmitter and modulator are not necessarily the same. The controlling alternating current from the transmitter is injected into the modulator between midpoints 23' and 29 of the two parallel connected modulator circuits. Also, I prefer to include a condenser 25' in this connection to prevent the flow of direct current through such connection. If desired, the alternating current control input from leads 22 may be introduced into the connection 23'—29 through a transformer or the like, and any desired amount of amplification of the input control current may be provided for. The direct current output circuit 15 is connected across midpoints 28 and 29 of the rectifier mesh as shown. There are a number of variations that can be made in the modulator circuit details, some of which are disclosed in my copending application previously referred to herein.

It is noted that the four dry type rectifiers 23 to 26, inclusive, are in the same direction about the mesh such that rectifiers 23 and 24 in series may pass one-half of the alternating current wave or waves, and that rectifiers 25 and 26 in series may pass the opposite half-cycle wave or waves received from the source 27 as modified by any alternating current injected through the connection 23'—29. The rectifiers are assumed to be alike so that when there is no alternating current introduced through leads 22 from the transmitter, the voltages at points 23', 28, and 29 of the modulator are the same and if not the same, adjustments are made to obtain balance under these conditions. A slight adjustment of the tap at 23' may suffice for this purpose. Hence under this condition, there is no voltage across midpoints 28 and 29 which are the connections to the direct current circuit leading to the zero center scale direct current instrument 12, and the instrument reads with its pointer at the zero current center of its scale. It is well known that the resistance of a dry type of rectifier decreases with current flow through it, or is said to have a high threshold value of resistance. This characteristic is represented by the full line volt-ampere curve I, Fig. 1, from which it is evident that the resistance drop will decrease with rise in current. I make use of this characteristic of the dry type of rectifier to unbalance the rectifier mesh circuit to produce a direct current output in proportion to the alternating current control input, the polarity of which output reverses with reversals in phase relation of the alternating current input control.

An attempted explanation of the operation of the modulator is as follows: When there is no alternating current input voltage between the condenser 25 and tap 23' and the latter is at the midvoltage point of the impedance 22', and assuming the rectifiers are all similar, it is evident that the voltages at points 28, 29, and 23' remain equal, and there is no tendency for current to flow through the instrument 12. At this time the excitation current which flows upward through rectifiers 2 and 24 during one half-cycle reduces the resistance of said rectifiers equally. Likewise the excitation current which flows downward through rectifiers 25 and 26 during the other half-cycle reduces the resistances of these rectifiers equally. Hence, under the conditions assumed, the points 28 and 29 remain at the same midpotential value, and this value is the same as that of point 23'.

Now assume that for the half-cycle when excitation current flows upward through rectifiers 23 and 24, an A.-C. input voltage is added between points 23' and 29 in phase with the excitation voltage and which is in a direction to send current through rectifier 24. Now more current will flow through rectifier 24 than through 23, and the resistance of rectifier 24 will be lowered in comparison to that of rectifier 23. Hence a voltage will exist between points 28 and 29 which sends current through instrument 12 from point 28 to point 29, which current may be considered to circulate through rectifiers 24 and 25 in an amount sufficient to reduce the voltage drop between points 28 and 29 to a point which will just maintain the current flow through instrument 12 which current is proportional to the original unbalance.

Now when the excitation and input voltages both reverse on the other half-cycle, more current flows through rectifier 25 than through 26, causing circulating current through instrument 12 in the same direction as before, and which again may be considered to circulate through rectifiers 24 and 25.

Now assume that the phase relation of the input voltage is reversed with respect to the excitation voltage. The circulating balancing currents which flow through instrument 12 now may be considered to circulate through rectifiers 26 and 23 and instrument 12, reversing the polarity of the direct current through the instrument.

Thus I have found that the introduction of alternating current between the points 23' and 29 if in phase or 180 degrees out of phase with the voltage of source 27 upsets the balance of the rectifier mesh, apparently modifying current flow that increases the resistance of certain rectifiers and decreases that of others such that direct current flows in instrument 12 of a magnitude proportional to the introduced alternating current and of a polarity which reverses with reversal in phase relation of the introduced control current. Also I have found that if the phase relation of the exciting and controlling alternating currents in the modulator is 90 degrees out of phase, instead of being in phase or 180 degrees out of phase, the direct current flow of zero regardless of the magnitude of the introduced controlling alternating current. It follows, therefore, that the instrument 12 may be calibrated to indicate the rate of flow and whether above or below normal. No sliding contacts are involved once the system has been adjusted and calibrated, and it has the further advantage of being able to use the high sensitivity type of direct current receiver instrument.

The same system can be reversed and I have shown switches at 30 and 31 for this purpose. When switch 30 is thrown down, the rectifier mesh is connected to a direct current input circuit containing a temperature measuring thermocouple 32 and a balancing direct current source of supply 33 and a balancing adjusting resistance 34. When switch 31 is thrown to the right, the flowmeter transmitter is disconnected and a phase responsive alternating current measuring instrument 35 is connected in the modulator connection between points 23' and 29. The instrument has a field winding 36 energized from source 27 and an armature winding 37 energized from the modulator.

At some selected temperature the voltage introduced into the direct current circuit 15 at resistance 34 from source 33 is made equal and opposite to the voltage of the thermocouple 32 so that there is no direct current input to the rectifier mesh. It is obvious that under these conditions there is no alternating current produced in the output circuit now connected to armature 37 of instrument 35. The instrument thus has no torque and is biased to a zero center position by suitable lead-in spirals, and the position of the pointer is marked on the scale for the selected temperature at the thermocouple under these balanced conditions.

Now, when the temperature of thermocouple 32 increases, its voltage will predominate over that of source 33 and a direct current input of a corresponding polarity and of a magnitude proportional to the increase in temperature will be introduced into the modulator across points 28 and 29. I have found that this produces an alternating current output to winding 37 of a magnitude proportional to the direct current input and of a phase relation relative to the phase of source 27 which reverses with reversal in polarity of the direct current input. Assume now that the polarity of the field of instrument 35 is in the direction of arrow $b$ when the polarity of the armature field is in the direction of the pointer with the armature in the zero deflection position; a torque will be produced which tends to place these fields in alignment and of a magnitude proportional to the armature field. The instrument will then deflect up-scale to the right to a point determined by the armature input current. When the temperature of the thermocouple 32 drops below the selected balancing temperature, the polarity of the D.-C. input will reverse and the phase of the A.-C. output to armature winding 37 will reverse, and this will cause the instrument to deflect to the left of center. The instrument scale may thus be calibrated in temperature units with thermocouple 32. It is of course necessary that the excitation voltage source 27 be maintained constant for accurate results.

In Fig. 3, I have shown an application of my invention for measuring the watts of an alternating current power system 38. The impedance 22' is supplied from the voltage of the system and hence, the alternating current excitation of the modulator ill vary with the voltage of the system. The alternating current control input to the connection 29—23' of the modulator is supplied through a transformer 39 from a current transformer 40 in one of the power lines. Hence this input will vary with the line current. Assuming the power factor to be unity, the two alternating current input voltages will be in phase or 180 degrees out of phase, depending upon the direction of power flow in the power line. Hence under these conditions the operation will be the same as that of Fig. 2 for the flowmeter application, except that the excitation voltage for the impedance 22' will vary with the voltage of line 38 and a direct current will flow in the zero center direct current measuring instrument 12 proportional to EI cos $\phi$, where E is the voltage, I the current, and cos $\phi$ the power factor, assumed to be unity, of the line 38. I have found that the direct current output does vary with cos $\phi$ and is zero at zero power factor when the phase relation of the excitation voltage across impedance 22' and the input to transformer 39 is 90 degrees relative to the voltage across 22'. Hence the instrument 12 may be calibrated directly in watts and will measure the watts, and moreover, will read in one direction from zero center when the power flow is in one direction and in the opposite direction from zero when the direction of power flow reverses.

If the voltage across impedance 22' be held constant as by connecting a voltage regulator 41 in series therewith, the meter 12 may be calibrated to read the power component of the line current.

In Fig. 4, I have represented the invention as used as a synchroscope. It is assumed that 27 and 42 are two alternating current sources to be synchronized to permit the connecting switch 43 to be closed. The modulator of my invention is excited from one source 27, and a small voltage from source 41 is injected into the alternating current input terminals of the modulator through a transformer 44. The indication of direct current instrument 12 will be steady only if the excitation and input alternating current frequencies are the same. Assume that the voltages from sources 27 and 42 are in phase. Then the loop currents A and B which tend to circulate in the upper and lower halves of the impedance 22' and through the condenser 25' will not be equal. Current B will be larger than A, for example, and a steady deflection of the zero center direct current instrument 12 will result. If the voltages from sources 27 and 42 are of the same relative magnitude as before but are 180 degrees out of phase, current A will be larger than B and instrument 12 will deflect a steady amount the same distance on the other side of zero center. If the voltages from 27 and 42 are 90 or 270 degrees out of phase, the resultant direct current output will be zero. If the frequency relation varies, the instrument 12 will swing to the right and left of zero at the beat frequency. In this manner the apparatus may be used as a synchronization means or indicator. A steady indication which may be zero or either direction from zero is an indication of the same frequency. A steady maximum indication to, say, the left of zero indicates an in-phase same frequency relation, and a steady maximum indication to the right of zero indicates a 180-degree out-of-phase same frequency relation. When in such in-phase relation and assuming the source voltages are the same, the switch 42 may be closed.

In Fig. 5, I have represented my invention for indicating the measurement of a magnetic gauging circuit. The modulator is excited from the alternating current source 27 as is also the gauge bridge having the resistance arms 45 and 46 and the reactance arms 47 and 48. In the gauge bridge the reactor 47 may be assumed to be a standard reactor which, after initial adjustment, remains constant; and that 48 is a reactor which is varied by some dimension or other factor to be measured as, for example, by varying the air gap of its magnetic core. It may be further assumed that the gauge bridge is balanced when the reactor 48 has a zero or other predetermined measurement adjustment such that the input to the modulator from the gauge bridge is zero. Now, when the reactance of 48 increases, the gauge bridge will become unbalanced in one direction causing the direct current zero center instrument 12 to deflect in one direction, and when the reactance of 48 decreases from the balanced condition, it will reverse the phase of the voltage from the unbalanced gauge bridge and cause instrument 12 to deflect in the reverse direction from zero center. Such deflections will be proportional to the increase and decrease of the reactance of 48 so that the scale of instrument 12 may be calibrated in terms of the measurement desired.

It is possible but usually undesirable to replace the two halves of impedance 22a, shown as a resistance, with the standard and variable reactors 47 and 48. For instance, assume the alternating current input terminals from the gauge bridge to the modulator to be short circuited. Then movement of tap 23 up and down from center will introduce an alternating current voltage into the circuit of condenser 25' which will reverse in phase with reversals of the direction of movement of the tap 23' from the mid or balanced position and the magnitude of which will be proportional to the movement from center position. Hence, it is possible to replace the two halves of impedance 22a with the two reactance gauges 47 and 48 and simplify the apparatus accordingly. However, if this is done, then the rectifiers 23, 24, 25, and 26 will be required to carry the full value of the reactor current whereas when the external gauge bridge is used, only the differential current from the reactance bridge is carried by the rectifiers. The latter arrangement does not require any compromise in the design of the reactors.

The arrangement of Fig. 5 may, however, be simplified to that shown in Fig. 6, without loss in sensitivity or compromise in the reactor design. In Fig. 6 the impedance 22b takes the place of impedance 22a and the resistances 45 and 46 of Fig. 5.

In Figs. 5 and 6, instead of reading the gauge position or unbalance on instrument 12, the adjustable tap 23' or 23a may be moved to adjust the instrument 12 reading to zero and the position of tap 23', Fig. 5, or tap 23a, Fig. 6, may be calibrated as represented in suitable gauge measuring units.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A phase sensitive modulator for producing a direct current output voltage proportional to an alternating current input voltage and of a polarity which reverses with reversals in phase of the input voltage comprising four rectifiers connected in closed series circuit relation in the same direction with terminals between each pair of rectifiers in the mesh thus formed, an impedance circuit and a source of alternating current supply connected across an opposite pair of the terminals of said mesh, a direct current output instrument connected across the other pair of opposite terminals of said mesh and an alternating current input circuit connected between one of said last-mentioned terminals and an intermediate point on said impedance circuit, the voltage of said input circuit being subject to variation in magnitude and phase relation relative to the voltage of said alternating current source of supply, and a condenser in said input circuit connection to prevent the flow of direct current therein.

2. A reversible alternating current direct current modulator comprising four rectifiers connected in a closed series mesh with all of the rectifiers connected in the same direction in the series connection and with terminals between each pair of rectifiers, an alternating current source of supply connected across opposite pairs of terminals of said mesh, an impedance circuit supplied by said source, a direct current circuit connected across the other opposite pairs of terminals of said rectifier mesh and an alternating current circuit connected between one of said last-mentioned terminals and an intermediate point of said impedance, said modulator being reversible to produce direct current in said direct current circuit proportional to alternating current flow in said alternating current circuit of a polarity depending upon the phase relation between said source of supply and the current in said alternating current circuit or to produce alternating current in said alternating current circuit proportional to direct current in said direct current circuit, and of a phase relation relative to said source of supply dependent on the polarity of such direct current.

3. A phase sensitive modulator comprising a rectifier mesh containing four rectifiers connected in closed series circuit relation with all of the rectifiers connected in the same direction in said series circuit, and with terminals between each pair of rectifiers, a fixed impedance and an alternating current source of supply connected across one pair of opposite terminals of said mesh, a direct current zero center instrument connected across the other pair of opposite terminals of said mesh, and an alternating current input circuit including a condenser connected between one of the last-mentioned terminals and an adjustable point of said impedance.

4. A phase sensitive modulator for measuring the wattage of an alternating current circuit comprising in combination with such a circuit a rectifier mesh comprising four rectifiers connected in the same direction in closed series circuit with terminals between the several rectifiers, connections for supplying a voltage proportional to and in phase with the power circuit voltage to opposite pairs of terminals of said rectifier mesh, a fixed impedance also supplied with such voltage, a direct current instrument connected across the other pair of opposite terminals of said mesh, and connections for impressing a voltage proportional to and in phase with the current flowing in the power circuit between one of said last-mentioned terminals and a midpoint of said impedance.

5. A phase sensitive measurement modulator comprising four rectifiers connected in the same direction in a closed circuit mesh with terminals between the several rectifiers, a source of alternating current supply connected to supply an opposite pair of terminals of said rectifier mesh, a fixed impedance circuit and a measurement impedance circuit also supplied from said source in parallel with the supply to said rectifier mesh, a direct current measuring instrument connected across the other pair of terminals of said rectifier mesh, said measurement impedance circuit containing a pair of series connected impedances one of which is varied in accordance with a measurement to vary the relative values of said impedances and the voltages across them, and a circuit including a condenser from a point between the last-mentioned impedances to one of the direct current instrument connected terminals of said mesh.

HENDRIK D. MIDDEL.